United States Patent
Kudo

(10) Patent No.: US 11,186,221 B2
(45) Date of Patent: *Nov. 30, 2021

(54) WORK VEHICLE WITH REAR PILLAR LAMP

(71) Applicant: YANMAR CO., LTD., Osaka (JP)

(72) Inventor: Junko Kudo, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/747,620

(22) Filed: Jan. 21, 2020

(65) Prior Publication Data

US 2020/0148099 A1 May 14, 2020

Related U.S. Application Data

(63) Continuation of application No. 15/522,479, filed as application No. PCT/JP2015/079496 on Oct. 20, 2015, now Pat. No. 10,562,443.

(30) Foreign Application Priority Data

Oct. 28, 2014 (JP) ................... 2014-219720

(51) Int. Cl.
  *B60Q 1/30* (2006.01)
  *F21S 43/20* (2018.01)
  (Continued)

(52) U.S. Cl.
  CPC ............. *B60Q 1/30* (2013.01); *B60Q 1/0035* (2013.01); *B60Q 1/2607* (2013.01);
  (Continued)

(58) Field of Classification Search
  CPC ...... B60Q 1/0035; B60Q 1/44; B60Q 1/2607; B60Q 1/2615; B60Q 1/2657;
  (Continued)

(56) References Cited

U.S. PATENT DOCUMENTS 4,855,877 A    8/1989  Otaka
5,549,166 A *  8/1996  Orbach ............... A01B 63/1117
                                                              172/3

(Continued)

FOREIGN PATENT DOCUMENTS

CN      202101118 U      1/2012
EP         2272715 A1 *  1/2011    ........... B60Q 1/0035
(Continued)

OTHER PUBLICATIONS

Machine translation of Arndt et al. EP 2,272,715 A1, retrieved from worldwide.espacenet.com on May 17, 2021 (Year: 2021).*

(Continued)

*Primary Examiner* — Rajarshi Chakraborty
*Assistant Examiner* — Steven Y Horikoshi
(74) *Attorney, Agent, or Firm* — Norton Rose Fulbright US LLP

(57) ABSTRACT

A purpose of the invention is to provide a tractor that includes a rear lamp with high designability. A tractor of the present invention includes a rear lamp, a cabin, a lamp housing that is provided along a longitudinal direction of a rear pillar of the cabin, and a light source that is housed in the lamp housing, wherein the rear lamp is provided from a vicinity of one end to a vicinity of the other end of the rear pillar in the longitudinal direction.

17 Claims, 17 Drawing Sheets

(51) Int. Cl.

| | |
|---|---|
| *F21S 43/30* | (2018.01) |
| *B60Q 1/00* | (2006.01) |
| *B60Q 1/26* | (2006.01) |
| *B60Q 1/34* | (2006.01) |
| *B60Q 1/44* | (2006.01) |
| *B62D 25/04* | (2006.01) |
| *B62D 49/06* | (2006.01) |

(52) U.S. Cl.
CPC ......... *B60Q 1/2615* (2013.01); *B60Q 1/2657* (2013.01); *B60Q 1/2696* (2013.01); *B60Q 1/34* (2013.01); *B60Q 1/44* (2013.01); *B62D 25/04* (2013.01); *F21S 43/26* (2018.01); *F21S 43/30* (2018.01); *B62D 49/06* (2013.01)

(58) Field of Classification Search
CPC .. B60Q 1/2661; B60Q 1/2686; B60Q 1/2696; B60Q 1/30; B60Q 1/38; B62D 49/0692; B66F 9/07581; B66F 9/20; B66F 9/24; F21S 43/14; F21S 43/19; F21S 43/195; F21W 2103/20; F21W 2103/35; F21W 2103/45
See application file for complete search history.

(56) References Cited

U.S. PATENT DOCUMENTS

| | | | |
|---|---|---|---|
| 5,688,036 A | | 11/1997 | Mashall et al. |
| 5,881,842 A | * | 3/1999 | Kikukawa ........... B66F 9/07545 187/222 |
| 6,619,824 B1 | | 9/2003 | Hou |
| 7,621,662 B1 | * | 11/2009 | Colbert ................ B60Q 1/2611 362/479 |
| 2002/0018349 A1 | | 2/2002 | Aikawa |
| 2004/0223315 A1 | | 11/2004 | Suehiro et al. |
| 2008/0164992 A1 | | 7/2008 | Ekladyous et al. |
| 2010/0284196 A1 | | 11/2010 | Lin |

FOREIGN PATENT DOCUMENTS

| | | |
|---|---|---|
| EP | 2272715 A1 | 1/2011 |
| FR | 2507980 A | 12/1982 |
| JP | S58080337 U | 5/1983 |
| JP | H0676610 A | 3/1994 |
| JP | H1159503 A | 3/1999 |
| JP | 2002216507 A | 8/2002 |
| JP | 2006137228 A * | 6/2006 |
| JP | 2006137228 A | 6/2006 |
| JP | 2006-193049 A | 7/2006 |
| JP | 2006193049 A * | 7/2006 |
| JP | 2006205764 A * | 8/2006 |
| JP | 2006205764 A | 8/2006 |
| JP | 2006248342 A | 9/2006 |
| JP | 2008079575 A | 4/2008 |
| JP | 2008290687 A | 12/2008 |
| JP | 4457031 B | 4/2010 |
| JP | 2010163036 A | 7/2010 |
| JP | 2011148471 A | 8/2011 |

OTHER PUBLICATIONS

Chinese Office Action dated Nov. 14, 2018 issued in corresponding CN Application 201580059363.5.
Japanese Office Action dated May 7, 2019 issued in corresponding JP Application 2014-219720.
Machine translation of J P-2008290687-A, retrieved on Mar. 5, 2019 (Year: 2019).
Machine Translation ofTakagi etal. JP 2006-137228 A, retrieved Dec. 12, 2018 (Year: 2018).
Machine Translation of Fujita et al. JP 2006-205764 A, retrieved Dec. 12, 2018 (Year: 2018).
Machine Translation of Kawai et al. JP H 11-059503 A, retrieved Dec. 12, 2018 (Year: 2018).
Extended European Search Report for corresponding EP Application No. 1585556.5-1762/3213962 PCT/JP2015079496; dated Oct. 10, 2017.
Notification of Reasons for Refusal for corresponding JP Application No. 2014-219720; dated Nov. 14, 2017.
Decision of Refusal for corresponding JP Application No. 2014-219720; dated Apr. 17, 2018.
International Search Report corresponding to Application No. PCT/JP2015/079496; dated Jan. 19, 2016, With English translation.

* cited by examiner

WORK VEHICLE WITH REAR PILLAR LAMP

CROSS REFERENCE TO RELATED APPLICATIONS

This application is a continuation from U.S. application Ser. No. 15/522,479 filed Apr. 27, 2017, which is the US national stage of International Application No. PCT/JP2015/079496 filed Oct. 20, 2015, which claims priority to JP Application No. 2014-219720 filed Oct. 28, 2014; the disclosure of each application is incorporated herein by reference.

DESCRIPTION

Technical Field

The present invention relates to a tractor that includes a rear lamp.

BACKGROUND ART

Conventionally, there have been known work vehicles such as farm tractors (see Patent Document 1) and earth-moving wheel loaders. Such work vehicles generally include rear lamps. The rear lamps include tail lamps, stop lamps, and turn signal lamps.

In view of the fact that the rear lamps must be disposed at predetermined positions, normally the rear lamps of a work vehicle are mounted as separate members on the upper portions of the rear fenders, for example.

PRIOR ART DOCUMENT

Patent Document 1: JP-A 2010-163036

SUMMARY OF THE INVENTION

However, in determining the disposition of the rear lamps, flexibility tends to be limited with a work vehicle having large driving wheels, of which the rear lamps must keep clear. Thus, in some cases, disposing the rear lamps at the predetermined positions reduces designability as seen from the rear side of the work vehicle.

An object of the present invention is to provide a tractor that includes a rear lamp with high designability.

A tractor of the present invention includes a rear lamp, a cabin, a lamp housing that is provided along a longitudinal direction of a rear pillar of the cabin; and a light source that is housed in the lamp housing, wherein the rear lamp is provided from a vicinity of one end to a vicinity of the other end of the rear pillar in the longitudinal direction.

In the tractor, an outer surface of the rear pillar may be curved outward in a convex manner, and the lamp housing may be curved along the outer surface of the rear pillar.

In the tractor, the rear lamp may be hidden by the rear pillar as seen from an operator seat.

In the tractor, the light source may constitute a tail lamp, a stop lamp and a turn signal lamp.

In the tractor, the rear lamp may include a lens that covers an opening of the lamp housing.

In the tractor, the rear lamp may include a light-transmissive lens cover that covers an outer surface of a lens.

In the tractor, the rear lamp may be provided with a rear reflector.

In accordance with the work vehicle of the present invention, the rear lamp is provided along the longitudinal direction of the rear pillar positioned behind the operator seat, resulting in high designability due to an integrated appearance between the rear lamp and the rear pillar.

In accordance with the tractor of the present invention, the rear lamp is provided from the vicinity of one end to the vicinity of the other end of the rear pillar, thereby improving the integrated appearance between the rear lamp and the rear pillar and achieving high designability. Further, the rear lamp extends in the top-bottom direction, resulting in excellent visibility. Still further, the rear lamp extends to the vicinity of a roof, resulting in short electrical wiring for the rear lamp through the roof.

The tractor of the present invention including the cabin provided with the rear pillar is applicable to a tractor including a cabin.

In accordance with the tractor of the present invention, the outer surface of the rear pillar is curved outward in a convex manner and the lamp housing is curved along the outer surface of the rear pillar, resulting in high designability due to an integrated appearance between the lamp housing and the rear pillar.

In accordance with the tractor of the present invention, the rear lamp is hidden by the rear pillar as seen from the operator seat, thereby preventing light of the rear lamp from coming into sight of the operator, which results in smooth operation.

In accordance with the tractor of the present invention, the light source constitutes a tail lamp, a stop lamp and a turn signal lamp, which allows the rear lamp to serve as a rear combination lamp.

In accordance with the tractor of the present invention, the rear lamp includes the lens covering the opening of the lamp housing, resulting in diffusion of light from the light source.

In accordance with the tractor of the present invention, the rear lamp includes the light-transmissive lens cover that covers an outer surface of the lens, thereby improving designability.

In accordance with the tractor of the present invention, the rear lamp is provided with the work lamp, the work machine raise/lower switch or the rear reflector, thereby reducing members separately mounted on the rear portion of the work vehicle and improving designability.

EMBODIMENTS OF THE INVENTION

The technical idea of the present invention is applicable to any work vehicle such as an agricultural machinery vehicle or a construction machinery vehicle. In the following, a description will be given of a tractor as a representative work vehicle. In the following, the front, rear, upper, lower, right, and left directions refer to those as seen from the operator seat (when the operator is seated).

Figure 1:
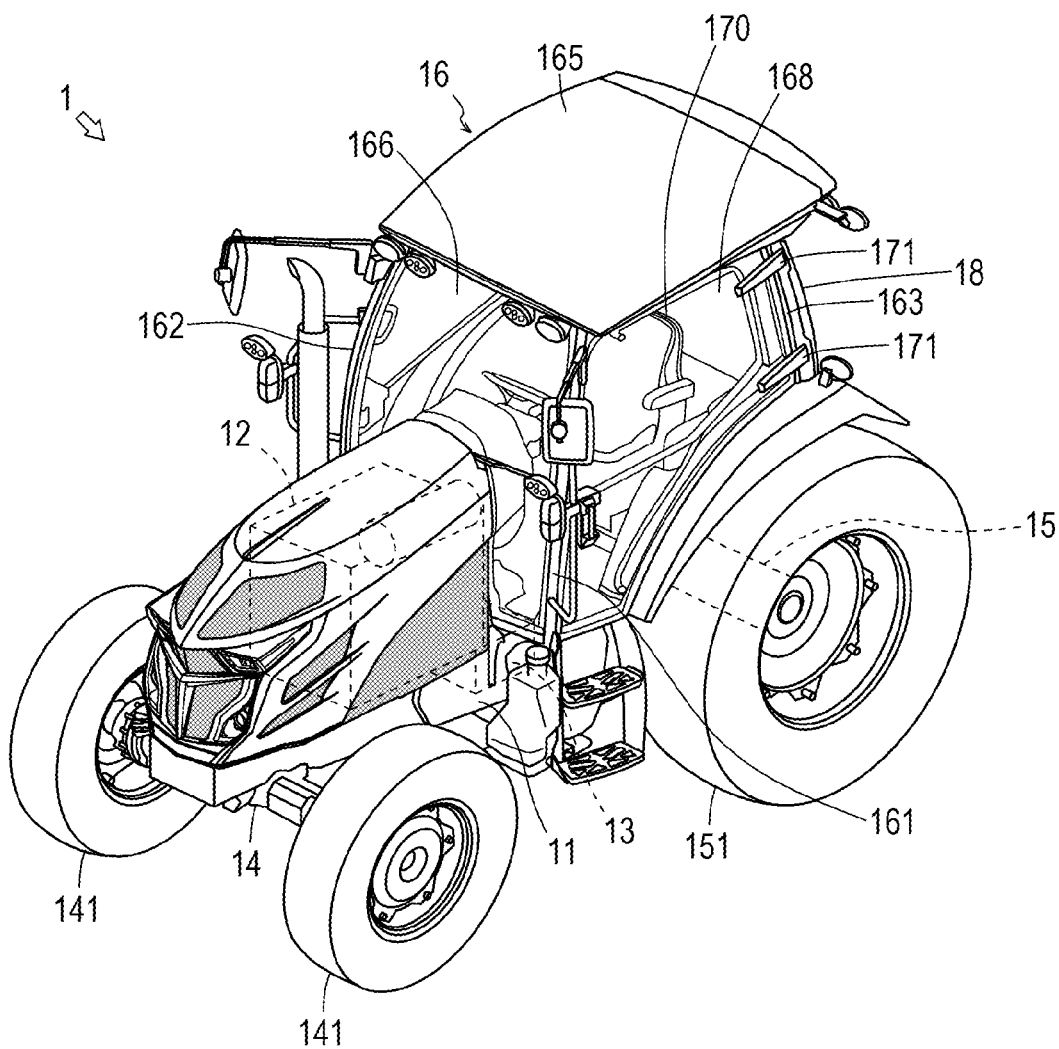
FIG. 1 is an exterior perspective view of a tractor.
Figure 2:
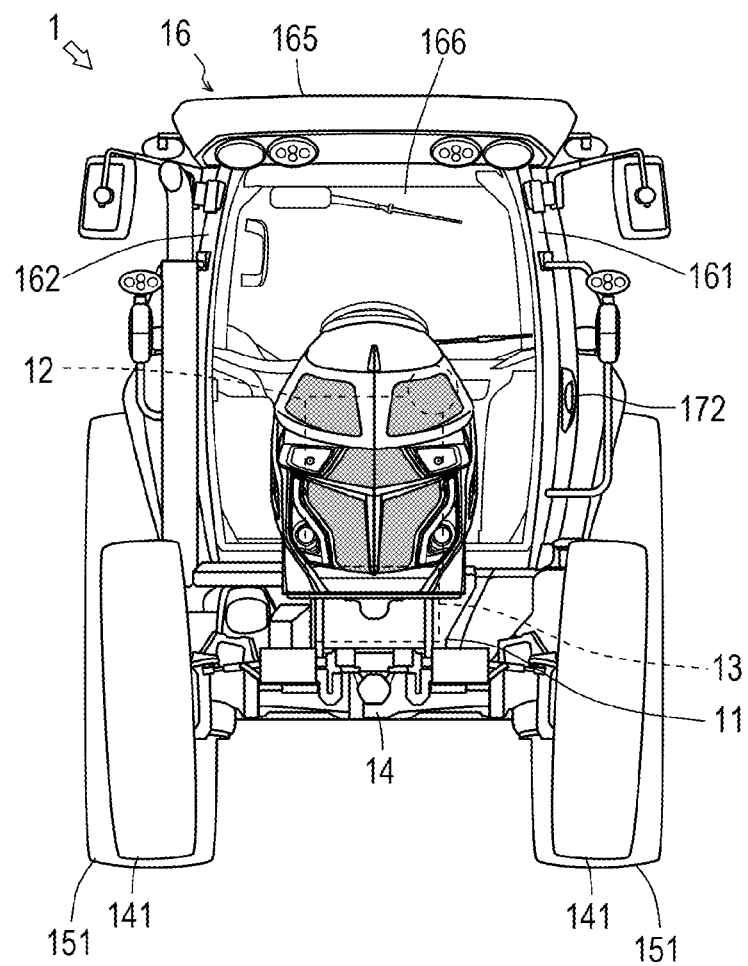
FIG. 2 is a front view of the tractor.
Figure 3:
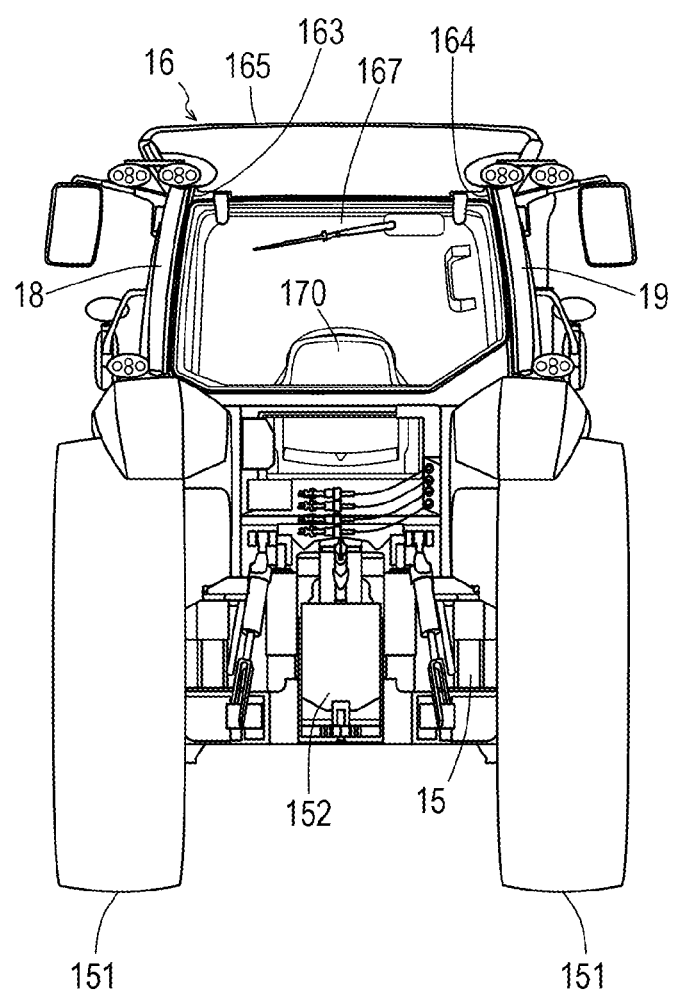
FIG. 3 is a rear view of the tractor.
Figure 4:
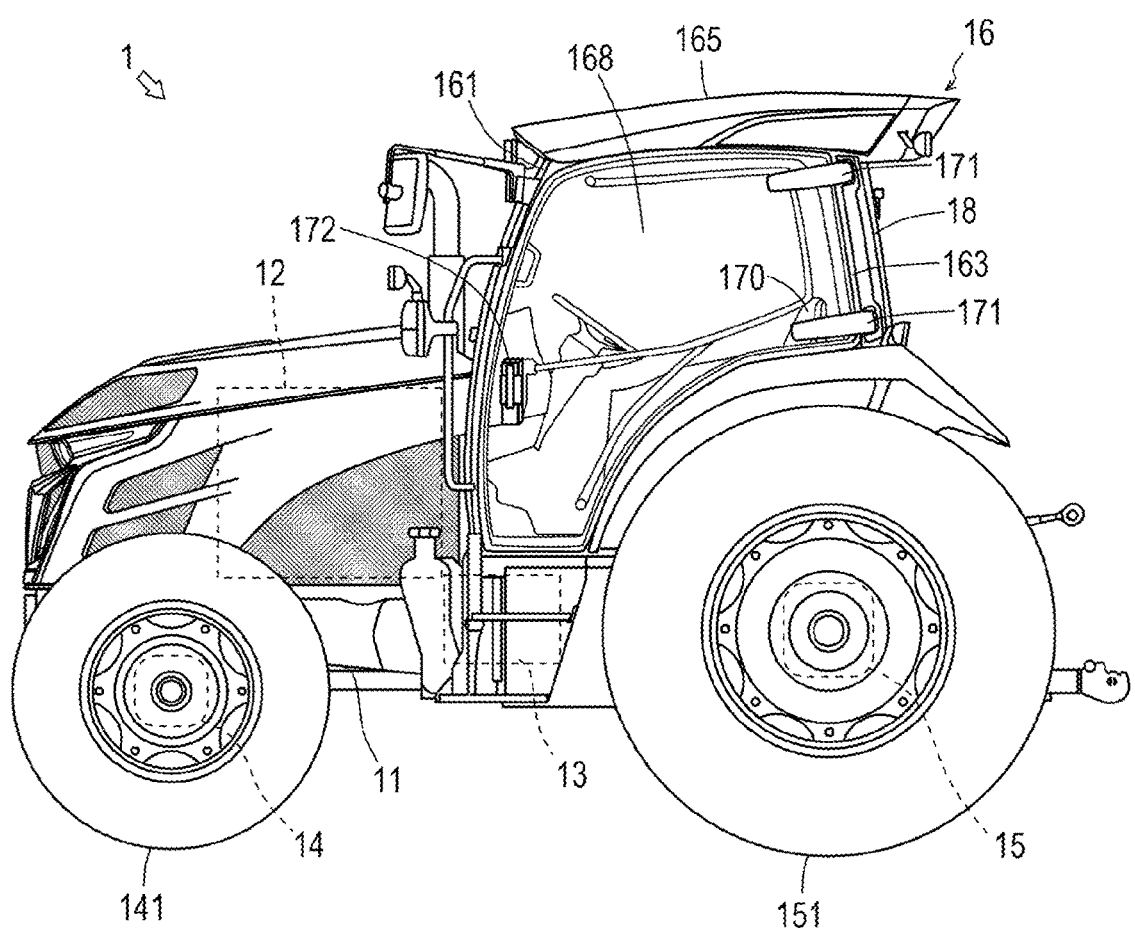
FIG. 4 is a right side view of the tractor.
Figure 5:
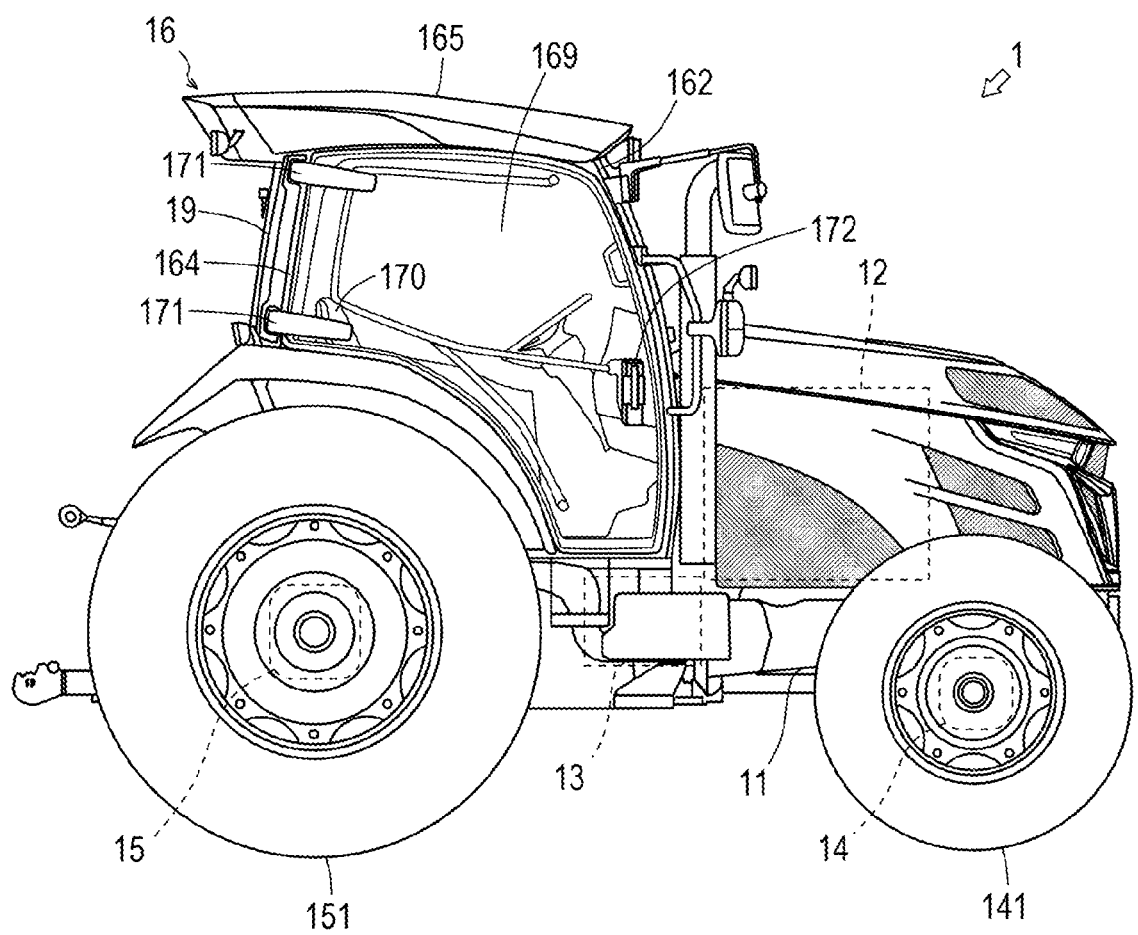
FIG. 5 is a left side view of the tractor.
Figure 6:
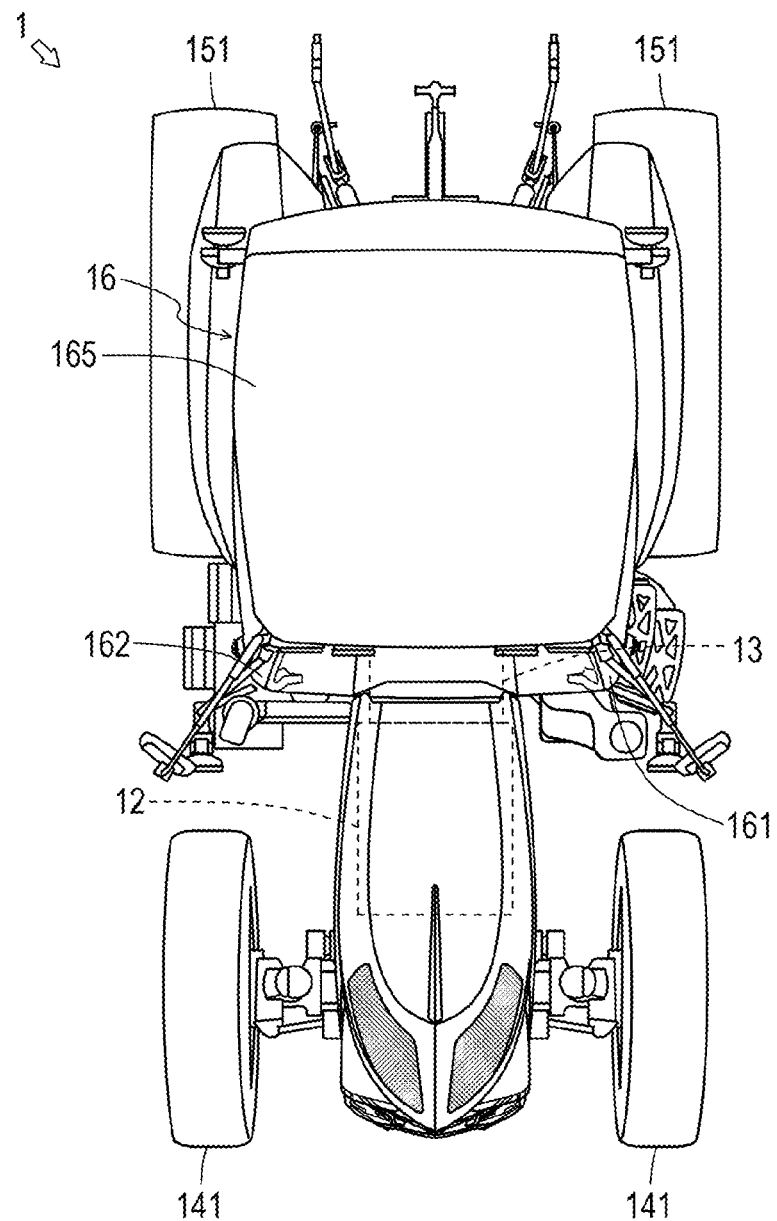
FIG. 6 is a plan view of the tractor.
Figure 7:
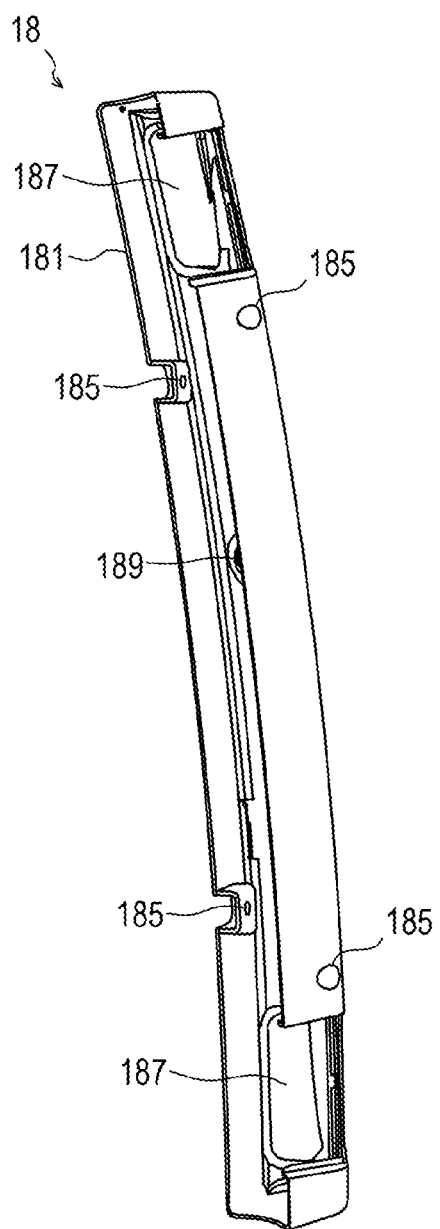
FIG. 7 is an enlarged front view of a left rear lamp.
Figure 8:
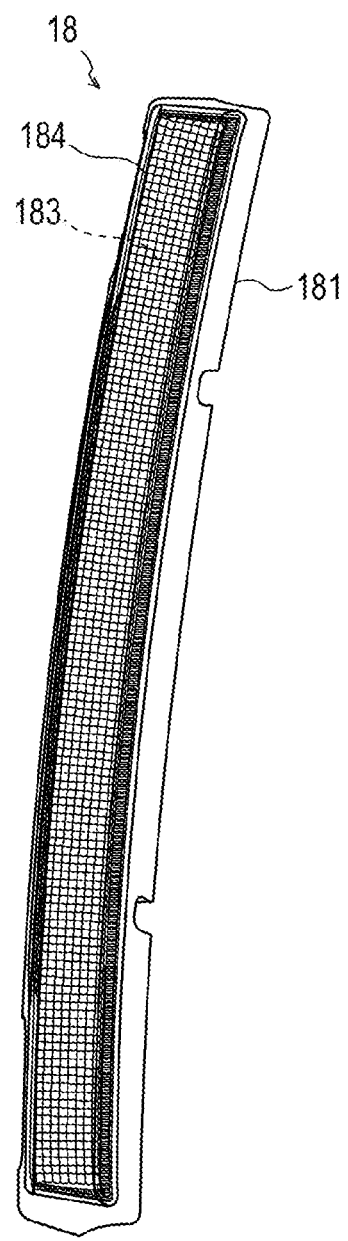
FIG. 8 is an enlarged rear view of the left rear lamp.
Figure 9:
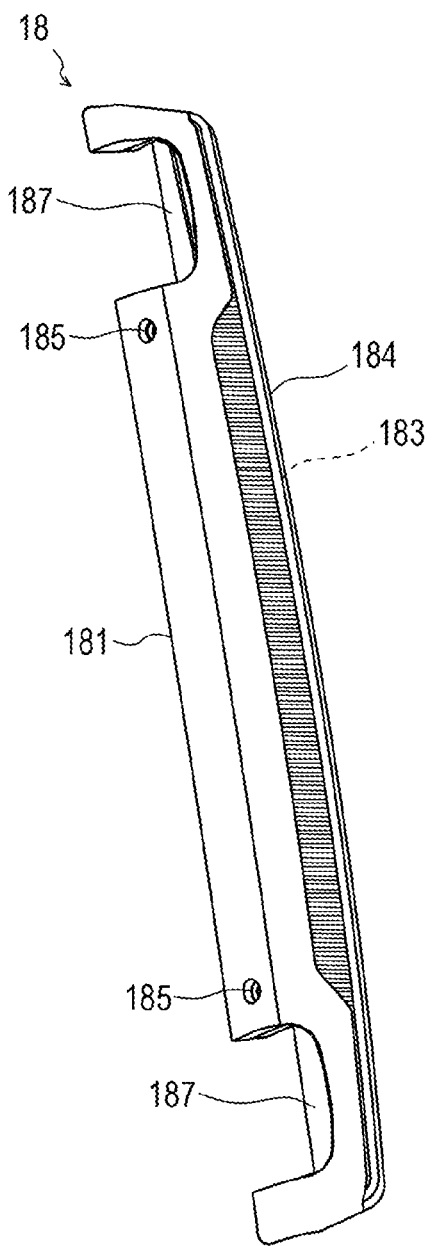
FIG. 9 is an enlarged right side view of the left rear lamp.
Figure 10:
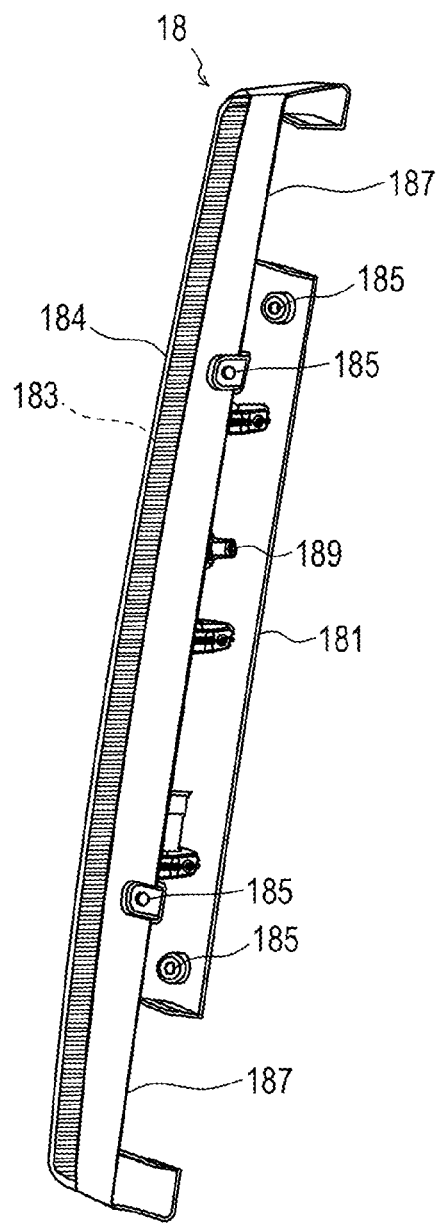
FIG. 10 is an enlarged left side view of the left rearlamp.
Figure 11:
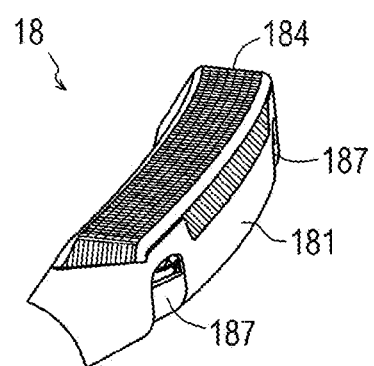
FIG. 11 is an enlarged plan view of the left rear lamp.

FIG. 1 is a perspective view of a tractor. FIG. 2 is a front view of the tractor. FIG. 3 is a rear view of the tractor. FIG. 4 is a right side view of the tractor. FIG. 5 is a left side view of the tractor. FIG. 6 is a plan view of the tractor.

The tractor 1 includes a frame 11, an engine 12, a transmission 13, a front axle 14, and a rear axle 15.

The frame 11 forms the framework on the front side of the tractor 1. The frame 11 constitutes, together with the transmission 13 and the rear axle 15, the chassis of the tractor 1. The engine 12 described in the following is supported by the frame 11.

The engine 12 converts thermal energy obtained by combustion of fuel to kinetic energy. That is, the engine 12 generates rotary power by burning fuel. Note that, an engine control apparatus is connected to the engine 12 (not shown). In accordance with the operator's operating an acceleration pedal, the engine control apparatus changes the operation state of the engine 12. Further, the engine 12 includes an exhaust gas purification apparatus (not shown). The exhaust gas purification apparatus oxidizes particulates, carbon monoxide, hydrocarbon and the like contained in the exhaust gas.

The transmission 13 transmits the rotary power of the engine 12 to the front axle 14 and the rear axle 15. The transmission 13 receives the rotary power of the engine 12 through a coupling mechanism. Note that, the transmission 13 includes a continuously variable transmission (HMT or 1-HMT). When the operator operates a gear shift lever, the continuously variable transmission changes the operating state of the transmission 13 according to the operator's operation.

The front axle 14 transmits the rotary power of the engine 12 to front tires 141. The front axle 14 receives the rotary power of the engine 12 through the transmission 13. Note that, a steering apparatus (not shown) is juxtaposed to the front axle 14. When the operator operates a steering wheel, the steering apparatus changes the steering angle of the front tires 141 according to the operator's operation.

The rear axle 15 transmits the rotary power of the engine 12 to rear tires 151. The rear axle 15 receives the rotary power of the engine 12 through the transmission 13. Note that, the rear axle 15 is provided with a PTO output apparatus 152. When the operator operates a PTO switch, the PTO output apparatus 152 transmits the rotary power to a towed work machine according to the operator's operation.

Further, the tractor 1 includes a cabin 16 that protects the operator from wind and weather. The cabin 16 has pillars 161 to 164 that are respectively disposed at the four corners, a roof 165 that is substantially rectangular as seen in a plan view and supported by the pillars 161 to 164, and four window panes 166 to 169 respectively provided between adjacent ones of the pillars 161 to 164. The inside of the cabin 16 is an operator's compartment where an operator seat 170 and the like are disposed.

The pillars 161 to 164 consist of two front pillars 161, 162 and two rear pillars 163, 164. The front pillars 161, 162 consist of left front pillar 161 and right front pillar 162, and the rear pillars 163, 164 consist of left rear pillar 163 and right rear pillar 164. Note that, the number of the pillars is not limited.

As to the pillars 161 to 164, for example as shown in FIGS. 1 to 6, the left front pillar 161 is curved left-frontward in a convex manner; the right front pillar 162 is curved right-frontward in a convex manner; the left rear pillar 163 is curved left-rearward in a convex manner; and the right rear pillar 164 is curved right-rearward in a convex manner.

In this manner, the pillars 161 to 164 may be curved outward in a convex manner relative to the cabin 16. The condition being curved outward is satisfied by at least the outer surface (the surface positioned outside the vehicle) of the pillars 161 to 164 being curved in any outward direction. An inner surface (a surface positioned inside the vehicle) is not necessarily curved outward.

The roof 165 is mounted on the upper ends of the pillars 161 to 164. As shown in FIG. 6, in a plan view, the rear pillars 163, 164 are hidden by the roof 165.

The window panes 166 to 169 consist of a front windshield 166, a rear windshield 167, a left side window pane 168, and a right side window pane 169. Note that, the window panes 166 to 169 are not specifically limited so long as they are transparent plates capable of transmitting visible light, and they may be made of a transparent resin material such as polycarbonate. The left side window pane 168 and the right side window pane 169 have their respective rear ends fixed to the left rear pillar 163 and the right rear pillar 164 with two hinges 171 each. Thus, the operator can open or close the left side window pane 168 and the right side window pane 169 gripping knobs 172 respectively provided at the front ends of the left side window pane 168 and the right side window pane 169.

The operator seat 170 is disposed at the center of the cabin 16 or slightly rearward relative to the center of the cabin 16. Around the operator seat 170, the gear shift lever, the steering wheel, the acceleration pedal, a brake pedal, a clutch pedal, a reverser lever, a speed dial, an instrument panel, a turn signal lamp lever, a light switch, a hazard switch, a work lamp switch and the like are disposed. The operator seated on the operator seat 170 can drive the tractor 1 using the acceleration pedal and the like.

Further, the tractor 1 includes rear lamps 18, 19 respectively provided at the rear pillars 163, 164. The rear lamps 18, 19 consist of a left rear lamp 18 provided at the left rear pillar 163 and a right rear lamp 19 provided at the right rear pillar 164. As shown in FIG. 3, the left rear lamp 18 and the right rear lamp 19 are laterally symmetrically shaped and disposed. In order to avoid repetitive descriptions, in the following, a description will be given mainly focusing on the left rear lamp 18, and a detailed description of the right rear lamp 19 will be omitted.

The left rear lamp 18 is provided along the longitudinal direction (the top-bottom direction) of the left rear pillar 163. This presents an integrated appearance between the left rear lamp 18 and the left rear pillar 163, and hence achieves high designability. In more detail, the left rear lamp 18 is curved along the outer surface of the left rear pillar 163. This enhances the integrated appearance. Note that, so long as the left rear lamp 18 extends along the outer surface of the left rear pillar 163, the left rear lamp 18 is not necessarily curved identically to the left rear pillar 163. For example, the left rear lamp 18 may partially project.

Further, the left rear lamp 18 is closely in contact with the left rear pillar 163. This also enhances the integrated appearance. Alternatively, a clearance may be formed between the left rear lamp 18 and the left rear pillar 163. For example, a clearance of a constant width may be formed between the left rear lamp 18 and the left rear pillar 163.

The left rear lamp 18 is provided from the vicinity of one end (upper end) to the vicinity of the other end (lower end) of the left rear pillar 163 in the longitudinal direction. That is, as seen from the rear side, the left rear pillar 163 is substantially covered with the left rear lamp 18. This enhances the integrated appearance between the left rear lamp 18 and the left rear pillar 163, and achieves high designability. Furthermore, the left rear lamp 18 being elongated in the top-bottom direction provides excellent visibility. Still further, the left rear lamp 18 extending to the vicinity of the roof 165 allows the electrical wiring for the left rear lamp 18 to be arranged through the roof 165 thereby shortening the length of the electrical wiring.

Further, the length and position of the left rear lamp 18 are not limited so long as the left rear lamp 18 extends along the outer surface of the left rear pillar 163. That is, the left rear lamp 18 is not necessarily provided from the vicinity of one end to the vicinity of the other end of the left rear pillar 163 in the longitudinal direction. For example, the left rear lamp 18 may be provided from the vicinity of the center to the vicinity of the other end of the left rear pillar 163 in the longitudinal direction. Conversely, the left rear lamp 18 may be provided from substantial one end to the center of the left rear pillar 163 in the longitudinal direction. Further, the left rear lamp 18 may be provided just at the vicinity of the center of the left rear pillar 163 in the longitudinal direction.

The left rear lamp 18 is formed so as to be hidden by the left rear pillar 163 as seen from the operator on the operator seat (when seated) 170. Therefore, the left rear lamp 18 is designed to have a reduced thickness, and a width narrower than that of the left rear pillar 163. Since the left rear lamp 18 is hidden by the left rear pillar 163 as seen from the operator seated on the operator seat 170, light of the left rear lamp 18 will not come within sight of the operator, thereby avoiding distracting the operator.

Figure 12:
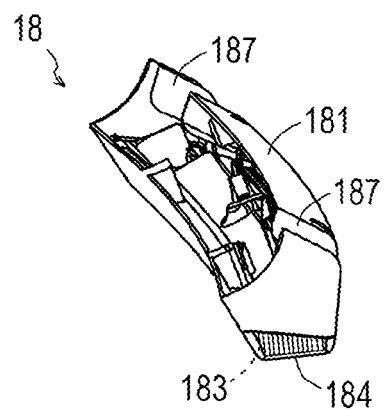
FIG. 12 is an enlarged bottom view of the left rear lamp.
Figure 13:
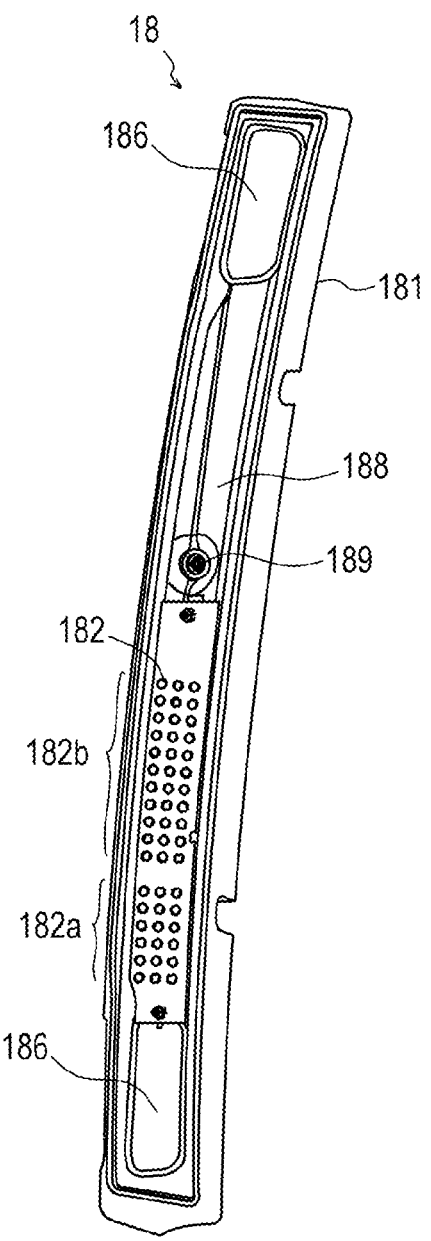
FIG. 13 is an illustration corresponding to FIG. 8 from which a lens and a lens cover are removed.
Figure 14:
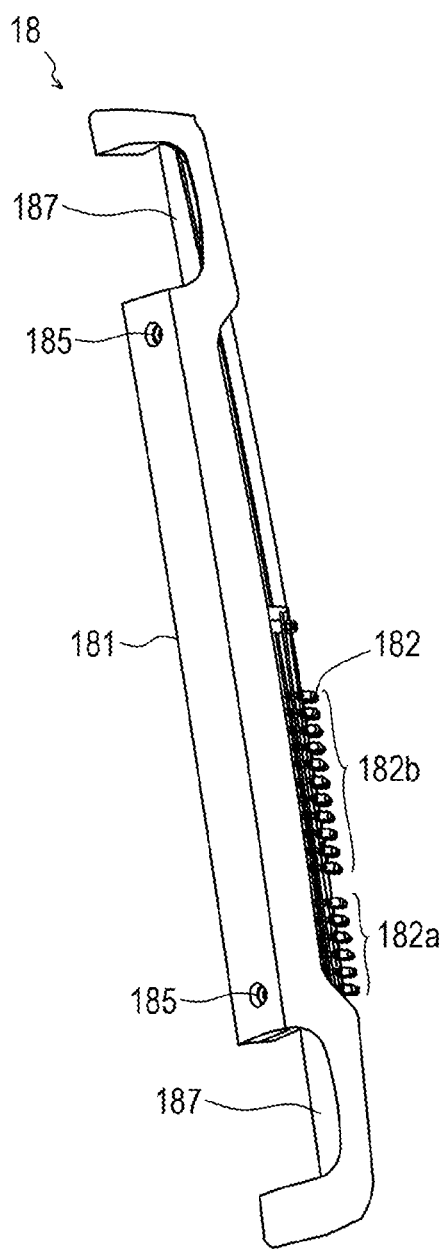
FIG. 14 is an illustration corresponding to FIG. 9 from which the lens and the lens cover are removed.
Figure 15:
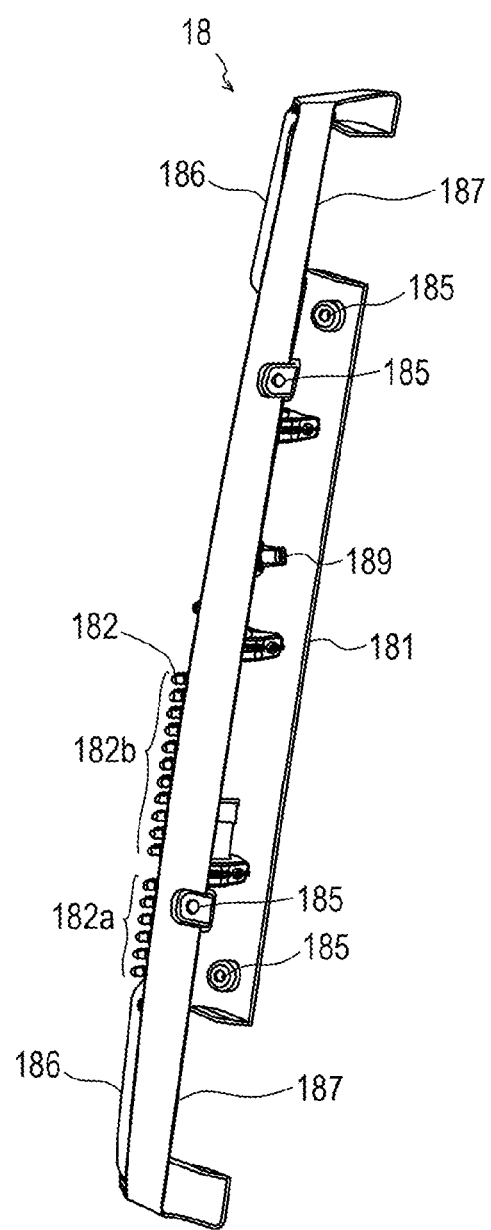
FIG. 15 is an illustration corresponding to FIG. 10 from which the lens and the lens cover are removed.
Figure 16:
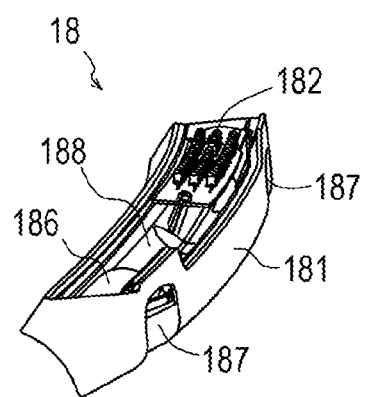
FIG. 16 is an illustration corresponding to FIG. 11 from which the lens and the lens cover are removed.
Figure 17:
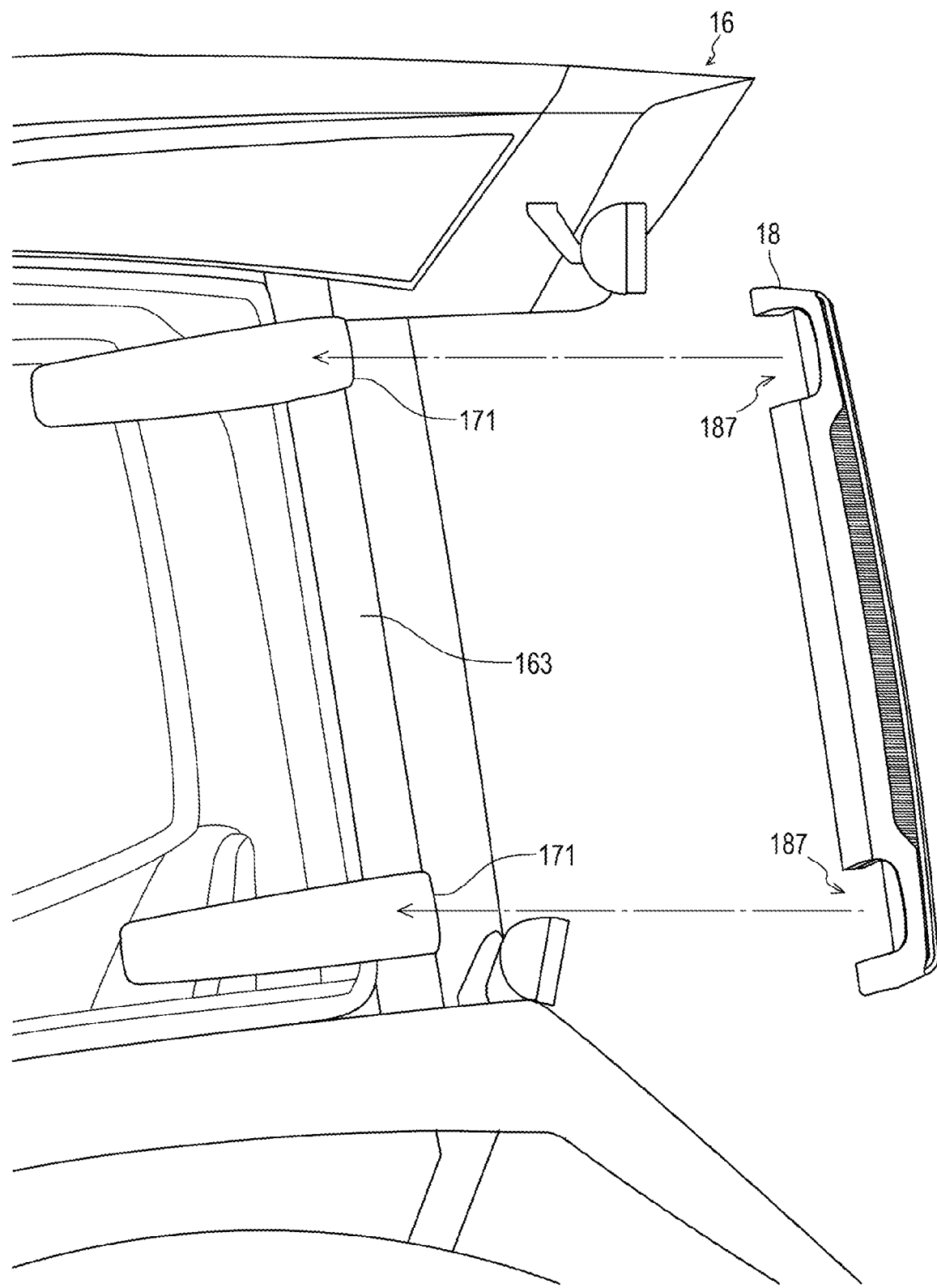
FIG. 17 is an illustration explaining the positional relationship between the left rear lamp and a left rear pillar.

FIGS. 7 to 12 are enlarged views of the left rear lamp. FIGS. 7 to 11 are illustrations seen from the directions identical to FIGS. 2 to 6, respectively. FIG. 12 is a bottom view. FIG. 13 is an illustration corresponding to FIG. 8 from which a lens and a lens cover are removed. FIG. 14 is an illustration corresponding to FIG. 9 from which the lens and the lens cover are removed. FIG. 15 is an illustration corresponding to FIG. 10 from which the lens and the lens cover are removed. FIG. 16 is an illustration corresponding to FIG. 11 from which the lens and the lens cover are removed. FIG. 17 is an illustration explaining the positional relationship between the left rear lamp and the left rear pillar.

The left rear lamp 18 includes a lamp housing 181, a light source 182, a lens 183, and a lens cover 184.

The lamp housing 181 is a box-shaped member that has an opening on the rear side surface, and formed by black-color resin, for example. The lamp housing 181 has an attaching surface formed along the left rear pillar 163. In the present embodiment, the outer surface of the left rear pillar 163 is curved outward in a convex manner, and the lamp housing 181 is curved along the outer surface of the left rear pillar 163 from the vicinity of the upper end to the vicinity of the lower end of the left rear pillar 163 in the longitudinal direction. This presents an integrated appearance between the lamp housing 181 and the left rear pillar 163, and achieves high designability.

Further, the lamp housing 181 is screwed to the left rear pillar 163 using four holes 185. Note that, the lamp housing 181 may be attached by other means such as snaps. Inside the lamp housing 181, projections 186 projecting rearward are formed respectively at the vicinity of the upper end and the vicinity of the lower end. The opposite surface sides of the projections 186 are recesses 187, where the two hinges 171 of the left side window pane 168 are partially housed (see FIG. 17). Between the projections 186 inside the lamp housing 181, a recess 188 that houses the light source 182 is formed. The recess 188 is provided with a hole (not shown) for screwing a substrate of the light source 182. Further, the recess 188 is provided with a reflective surface by aluminum deposition or the like. Further, providing a partition inside the lamp housing 181 as appropriate can prevent light leakage from the light source 182. For example, a partition separating the recess 188 and the projections 186 from each other can be provided.

Further, in the recess 188 of the lamp housing 181, a through hole 189 for passing an electrical wiring for the light source 182 is formed. The through hole 189 is disposed immediately above the light source 182, and penetrates in the front-rear direction. The electrical wiring passes through the roof 165 and the left rear pillar 163, and connected to the light source 182 through a hole provided at the position overlapping the through hole 189 of the left rear pillar 163 and the through hole 189.

The light source 182 is made up of one substrate and a plurality of red-color LEDs and a plurality of orange-color LEDs mounted on the substrate. In the present embodiment, three LEDs are arranged in line in the right-left direction to lead their respective columns. In each column, red-color LEDs are arranged by six pieces in the top-bottom direction so that the columns form a red-color LED group 182*a*. In each column, orange-color LEDs are arranged by eleven pieces in the top-bottom direction so that the columns form an orange-color LED group 182*b*. The orange-color LED group 182*b* is disposed above the red-color LED group 182*a*. The red-color LED group 182*a* serves as a tail lamp and a stop lamp, and the orange-color LED group 182*b* serves as a turn signal lamp.

The light source 182 is housed in the recess 188 of the lamp housing 181. As seen from the right and left side surfaces, the LED portion (the light emitting part) projects further than the right and left side surfaces of the lamp housing 181. Thus, a greater amount of light can be extracted to the right and left sides, and visibility from the right and left sides improves.

In this manner, employing LEDs as the light source 182 can reduce the thickness of the left rear lamp 18. The reduced thickness contributes to realizing the manner of the left rear lamp 18 being hidden by the left rear pillar 163 as seen from the operator seat 170. Note that, any light source other than LEDs may be employed as the light source 182.

The rear lamp according to the present embodiment is a rear combination lamp in which three types of lamps (the tail lamp, the stop lamp, and the turn signal lamp) are installed. Alternatively, the rear lamp may be embodied as one type of lamp, or a combination of two or four or more types of lamps.

The lens 183 is a light diffusing member that covers the opening of the lamp housing 181. The lens 183 is just required to be a light-transmissive member, and for example may be made of transparent resin. The lens 183 covers the entire rear side surface of the lamp housing 181, and partially wraps the top, bottom, right, and left side surfaces. In particular, a portion of the lens 183 that overlaps the right side surface of the light source 182 extends so as to wrap the right side surface of the light source 182. The entire rear side surface of the lens 183 is faceted in a grid-like manner, and the top, bottom, right, and left side surfaces of the lens 183 are faceted in a slit-like manner. Optimizing the shape or size of the facets, the substrate and the like of the light source 182 become visually unobtrusive, and hence designability improves. Note that, the lens 183 is not limited to such a shape. The lens 183 is just required to be disposed at least on the rear side of the light source 182. For example, the lens may be provided just at a portion overlapping the light source 182.

Alternatively to the mode described above, a white-color light source may be employed as the light source 182, and colored lens in red or orange may be employed as the lens 183.

The lens cover 184 is a light-transmissive member that covers the outer surface of the lens 183. The lens cover 184 may be made of transparent resin, for example. The lens cover 184 covers the entire rear side surface of the lens 183, and extends longer on part of the top, bottom, right, and left side surfaces of the lamp housing 181 than the lens 183 does. The top, bottom, right, and left side surfaces of the lens cover 184 are respectively flush with the top, bottom, right, and left side surfaces of the lamp housing 181, presenting an integrated appearance between the surfaces and the lamp housing 181 and achieving high designability. In order to be flush, the top, bottom, right, and left side surfaces of the lamp housing 181 are provided with grooves for fitting to the lens cover 184.

Further, various components can be added in the space in the left rear lamp 18 excluding the light source 182. For example, a work lamp, a work machine raise/lower switch, a rear reflector and the like may be provided in the space.

The work lamp may be provided, for example, in the recess 188 of the lamp housing 181 and above the light source 182. The work machine raise/lower switch is normally provided at a rear portion of the rear fender, and includes a button for raising the coupled work machine and a button for lowering the same. The work machine raise/lower switch may be provided, for example, at the projections 186 beneath the light source 182 of the lamp housing 181. In this case, the lens 183 and the lens cover 184 should have a length up to the lower end of the light source 182, so as to avoid interference with the work machine raise/lower switch. The rear reflector may be provided, for example, at a position in the rear side surface of the lens 183 or the lens cover 184 where interference with the light source 182 can be avoided. The rear reflector can be formed by subjecting the lens 183 or the lens cover 184 to reflection works.

As described above, installing in the left rear lamp 18 the components such as the work lamp, the work machine raise/lower switch, and the rear reflector which have conventionally been provided separately from the rear lamp reduces members separately mounted on the rear side of the tractor 1, and improves designability.

While the cabin is provided in the above-described embodiment, the present invention is applicable to a work vehicle not including a cabin. For example, the present invention is also applicable to a work vehicle including a canopy or a roll bar. In this case also, the rear lamp is provided to a rear pillar positioned behind the operator seat. For example, the rear lamp is provided to the rear pillar of the canopy or the rear pillar of the roll bar. In this manner, the present invention is applicable to a work vehicle that at least includes a rear pillar positioned behind the operator seat. The shape or function of the rear pillar is not specifically limited. For example, the rear pillar may be inverted C-shaped. In this case, a laterally elongated rear lamp may be provided along the horizontal portion of the rear pillar. Further, the rear pillar may not be the rearmost pillar so long as it is positioned behind the operator seat.

Further, the rear lamp may not be provided in a right and left pair, and the rear lamp may be one in number. Still further, the right and left rear lamps may be asymmetric.

The present invention is applicable to a work vehicle such as a farm tractor or an earthmoving wheel loader.

DESCRIPTION OF REFERENCE SIGNS

1, Tractor (work vehicle)
16, Cabin
18, Left rear lamp
19, Right rear lamp
163, Left rear pillar
164, Right rear pillar
170, Operator seat
181, Lamp housing
182, Light source
183, Lens
184, Lens cover

The invention claimed is:

1. A work vehicle comprising;
a cabin comprising right and left pillars;
a lamp comprising a lamp housing; and
a light source housed in the lamp housing; and
wherein:
the lamp housing is provided along an outer surface of one of the right and left pillars;
the lamp housing is provided in a longitudinal direction of the one of the right and left pillars so as to overlap the one of the right and left pillars; and
the lamp housing extends along a rear surface of one of the right and left pillars and includes a curved rear surface, the curved rear surface defining one or more recesses configured to adjoin a rear portion of a hinge positioned on one of the right and left pillars.

2. The work vehicle according to claim 1, wherein:
the lamp is a rear lamp;
the right and left pillars are rear pillars; and
the lamp housing is provided so as to overlap the one of the right and left pillars in the longitudinal direction of the pillar from an upper portion to a lower portion of the one of the right and left pillars.

3. The work vehicle according to claim 2, wherein:
the outer surface of the one of the right and left pillars includes a rearward outward surface that is curved outward in a convex manner and configured to match the curved rear surface of the lamp housing.

4. The work vehicle according to claim 3, wherein the lamp is hidden by the one of the right and left pillars as seen from an operator seat of the work vehicle.

5. The work vehicle according to claim 3, wherein:
the lamp comprises a switch configured to both raise and lower a work machine coupled to the work vehicle, the switch provided within the lamp housing; and
the lamp is provided on the outer surface of the one of the right and left pillars with the switch.

6. The work vehicle according to claim 2, wherein the light source constitutes a tail lamp, a stop lamp, and a turn signal lamp.

7. The work vehicle according to claim 2, wherein the lamp includes a lens configured to cover an opening of the lamp housing.

8. The work vehicle according to claim 7, wherein the lamp includes a light-transmissive lens cover configured to cover an outer surface of the lens.

9. The work vehicle according to claim 1, wherein the lamp housing includes a second surface opposite the curved rear surface, the second surface rearward of the curved rear surface with respect to the cabin, and the curved rear surface interposed between the second surface and the rear surface of one of the right and left pillars.

10. A work vehicle comprising:
a first rear pillar;
a second rear pillar; and
a lamp coupled to the first rear pillar, the lamp comprising:
a lamp housing including a curved rear surface extending along an outer rear surface of the first rear pillar in a longitudinal direction of the first rear pillar such that the lamp housing overlaps the first rear pillar, a first side that defines a recess, and a second side that defines the curved rear surface opposite the first side and defines a second recess configured to adjoin a rear portion of a hinge positioned on the first rear pillar;
a lens configured to cover the recess; and
a light source housed in the lamp housing.

11. The work vehicle according to claim 10, wherein:
the outer surface of the first rear pillar includes a rearward outward surface that is curved outward in a convex manner and configured to match the curved rear surface of the lamp housing.

12. The work vehicle according to claim 11, wherein the lamp housing overlaps a rear portion of the first rear pillar such that the lamp is not visible from a line-of-sight extending from an operator seat disposed within a cabin that is at least partially defined by the first and second rear pillar.

13. The work vehicle according to claim 11, wherein the lamp housing includes a rear side surface coupled to the outer surface of the first rear pillar, the rear side surface defining an opening such that the outer surface of the first rear pillar and the lamp housing cooperate to define a cavity.

14. The work vehicle according to claim 10, wherein:
the lamp housing includes a third side that extends between the first and second side, at least a portion of the third side defines the recess; and
the lens is disposed on the first and third side to cover the recess.

15. The work vehicle according to claim 14, wherein:
the lamp housing includes a fourth side that extends from the first side; and
the fourth side and the second side define an opening of the lamp housing.

16. The work vehicle according to claim 15, the fourth side and the second side each define one or more holes configured to secure the lamp to the first rear pillar.

17. The work vehicle according to claim 10, wherein the first rear pillar is a right rear pillar.

* * * * *